(12) United States Patent
Furumoto et al.

(10) Patent No.: US 10,475,448 B2
(45) Date of Patent: Nov. 12, 2019

(54) SPEECH RECOGNITION SYSTEM

(71) Applicant: MITSUBISHI ELECTRIC CORPORATION, Tokyo (JP)

(72) Inventors: Yuki Furumoto, Tokyo (JP); Masanobu Osawa, Tokyo (JP); Takumi Takei, Tokyo (JP); Naoya Baba, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 15/502,646

(22) PCT Filed: Sep. 30, 2014

(86) PCT No.: PCT/JP2014/076121
§ 371 (c)(1),
(2) Date: Feb. 8, 2017

(87) PCT Pub. No.: WO2016/051519
PCT Pub. Date: Apr. 7, 2016

(65) Prior Publication Data
US 2017/0243580 A1    Aug. 24, 2017

(51) Int. Cl.
*B60K 35/00* (2006.01)
*G01C 21/26* (2006.01)
(Continued)

(52) U.S. Cl.
CPC .............. *G10L 15/22* (2013.01); *B60K 35/00* (2013.01); *G01C 21/26* (2013.01);
(Continued)

(58) Field of Classification Search
None
See application file for complete search history.

(56) References Cited

U.S. PATENT DOCUMENTS 7,246,062 B2 * 7/2007 Knott ...................... G10L 15/22
                                                            704/246
8,265,939 B2 * 9/2012 Kanevsky ........... G10L 15/1815
                                                            704/251
(Continued)

FOREIGN PATENT DOCUMENTS

JP        2002-336183 A     11/2002
JP        2003-308079 A     10/2003
(Continued)

*Primary Examiner* — Marcus T Riley
(74) *Attorney, Agent, or Firm* — Birch, Stewart, Kolasch & Birch, LLP

(57) ABSTRACT

A speech recognition system, which continuously recognizes speech uttered by at least one user and controls a navigation system on the basis of a recognition result, includes: a speech-operation-intention determination unit for determining whether or not the user has made a recognized speech with the intention of operating the navigation system through speech; and a control mode altering unit for changing, when the speech-operation-intention determination unit determines that the user has no operation intention, the control mode of the navigation system in such a manner that the user is less aware of or pays less attention to the control mode than the case in which the speech-operation-intention determination unit determines that the user has an intention of operating the navigation system.

4 Claims, 6 Drawing Sheets

(51) Int. Cl.
*G01C 21/36* (2006.01)
*G10L 15/18* (2013.01)
*G10L 15/22* (2006.01)
*G10L 15/28* (2013.01)
*G10L 25/51* (2013.01)
*B60R 16/037* (2006.01)
*G10L 21/0316* (2013.01)

(52) U.S. Cl.
CPC ...... *G01C 21/3608* (2013.01); *G10L 15/1815* (2013.01); *G10L 15/28* (2013.01); *G10L 21/0316* (2013.01); *B60K 2370/152* (2019.05); *B60K 2370/55* (2019.05); *B60R 16/0373* (2013.01); *G10L 25/51* (2013.01); *G10L 2015/223* (2013.01); *G10L 2015/227* (2013.01)

(56) References Cited

U.S. PATENT DOCUMENTS

| | | | | |
|---|---|---|---|---|
| 8,311,835 | B2* | 11/2012 | Lecoeuche | H04M 1/72561 704/270 |
| 8,612,223 | B2* | 12/2013 | Minamino | G10L 15/183 704/231 |
| 2003/0191648 | A1* | 10/2003 | Knott | G10L 15/22 704/275 |
| 2005/0278110 | A1* | 12/2005 | Horio | G01C 21/3608 701/532 |
| 2006/0212291 | A1* | 9/2006 | Matsuo | G10L 21/028 704/231 |
| 2007/0055529 | A1* | 3/2007 | Kanevsky | G10L 15/1822 704/275 |
| 2008/0221903 | A1* | 9/2008 | Kanevsky | G10L 15/1822 704/275 |
| 2010/0118200 | A1* | 5/2010 | Gelman | G06F 3/041 348/578 |
| 2011/0029311 | A1* | 2/2011 | Minamino | G10L 15/183 704/243 |
| 2014/0308930 | A1* | 10/2014 | Tran | H04W 4/18 455/414.1 |
| 2015/0068069 | A1* | 3/2015 | Tran | H04B 1/385 36/136 |
| 2015/0127340 | A1* | 5/2015 | Epshteyn | G10L 15/26 704/235 |
| 2017/0243580 | A1* | 8/2017 | Furumoto | G01C 21/26 |

FOREIGN PATENT DOCUMENTS

| | | |
|---|---|---|
| JP | 2007-219207 A | 8/2007 |
| JP | 2008-14818 A | 1/2008 |
| JP | 2008-29921 A | 12/2008 |
| JP | 2008-298851 A | 12/2008 |
| JP | 2011-118290 A | 6/2011 |
| JP | 2011-128766 A | 6/2011 |
| JP | 2011-227237 A | 11/2011 |
| JP | 2013-007917 A | 1/2013 |

* cited by examiner

FIG.2

| Reliability | Determination Items for Determining Speech-Operation-Intention |
|---|---|
| High | Articulation of Uttered Speech Is Not Less than Threshold |
| Low | Volume of Uttered Speech Is Not Less than Average Volume of Multiple Past Uttered Speeches |
| Low | Pitch of Uttered Speech Is Not Less than Average Pitch of Multiple Past Uttered Speeches |
| Low | Rate of Uttered Speech Is Not Greater than Average Rate of Multiple Past Uttered Speeches |
| ... | ... |

FIG.3A

| Recognition Target Word | Speech-Operation-Intention | |
|---|---|---|
| | Yes | No |
| Convenience Store | Retrieve Convenience Stores around Self Vehicle And Display List of Retrieval Results | Do Nothing |
| Mr. Child | Display List of Albums of Mr. Child | Do Nothing |
| ... | ... | ... |

FIG.3B

| | Speech-Operation-Intention | |
|---|---|---|
| | Yes | No |
| Recognition Failure | Output Speech: "Unable to recognize. Speak once more, please." | Do Nothing |

FIG.4A

| Recognition Target Word | Speech-Operation-Intention | |
|---|---|---|
| | Yes | No |
| Convenience Store | Retrieve Convenience Stores around Self Vehicle And Display List of Retrieval Results | Create And Display Button for Retrieving Convenience Stores around Self Vehicle |
| Mr. Child | Display List of Albums of Mr. Child | Create And Display Button for Displaying List of Albums |
| ... | ... | ... |

FIG.4B

| | Speech-Operation-Intention | |
|---|---|---|
| | Yes | No |
| Recognition Failure | Output Speech: "Unable to recognize. Speak once more, please." | Output Notification Sound |

FIG.4C

| | Speech-Operation-Intention | |
|---|---|---|
| | Yes | No |
| Recognition Failure | Output at Volume 8: "Unable to recognize. Speak once more, please." | Output at Volume 3: "Unable to recognize. Speak once more, please." |

FIG.5A

| Recognition Target Word | Speech-Operation-Intention | | |
|---|---|---|---|
| | Yes | | No |
| | Reliability "High" | Reliability "Low" | |
| Convenience Store | Retrieve Convenience Stores around Self Vehicle And Display Information about Nearest Convenience Store | Retrieve Convenience Stores around Self Vehicle And Display List of Retrieval Results | Create Button for Retrieving Convenience Stores around Self Vehicle |
| Mr. Child | Playback First Album | Display List of Albums of Mr. Child | Create Button for Displaying List of Albums |
| ... | ... | ... | ... |

FIG.5B

| | Speech-Operation-Intention | | |
|---|---|---|---|
| | Yes | | No |
| | Reliability "High" | Reliability "Low" | |
| Recognition Failure | Output Speech: "Unable to recognize. Speak once more, please." | Output Notification Sound | Do Nothing |

FIG.6A

| Recognition Target Word | Speech-Operation-Intention | | |
|---|---|---|---|
| | Yes | | No |
| | Reliability "High" | Reliability "Low" | |
| Convenience Store | Retrieve Convenience Stores around Self Vehicle And Display Information about Nearest Convenience Store | Create Button for Retrieving Convenience Stores around Self Vehicle | |
| Mr. Child | Playback First Album | Create Button for Displaying List of Albums | |
| ... | ... | ... | ... |

FIG.6B

| | Speech-Operation-Intention | | |
|---|---|---|---|
| | Yes | | No |
| | Reliability "High" | Reliability "Low" | |
| Recognition Failure | Output Speech: "Unable to recognize. Speak once more, please." | Output Notification Sound Only | |

SPEECH RECOGNITION SYSTEM

TECHNICAL FIELD

The present invention relates to a speech recognition system for recognizing speech uttered by at least one user.

BACKGROUND ART

Heretofore, there has been known a speech recognition system that continuously recognizes speech uttered by a user, and executes a process corresponding to the recognition result (see Patent Document 1, for example). Such a speech recognition system carries out the recognition process without determining whether the user has made the speech with the intention of operating the system through speech or with the intention to talk with other users, and executes a process corresponding to the recognition result.

For example, assume that a conversation between users occurred as follows: "Which do you prefer, supermarkets or convenience stores?", and "I would prefer convenience stores.". Here, the users do not talk with the intention of operating the speech recognition system through speech. However, since the system continuously recognizes the speech of the users, it recognizes words, such as "supermarket" and "convenience store", and executes process corresponding to recognition results.

In addition, if the speech recognition system fails to recognize the user's speech, it is necessary for the system to inform the user of a failure in speech recognition and the cause of the failure by output ting a speech. Thus, also in the case in which the system fails to recognize the conversation between the users above, the system outputs a speech about a failure in speech recognition.

CITATION LIST

Patent Literature

Patent Document 1: Japanese Patent Laid-Open No. 2008-14818.

SUMMARY OF INVENTION

Technical Problem

Since the conventional speech recognition system of the prior art is configured above, the system automatically executes a process corresponding to a recognition result even if the user has made a speech without any intention of operating the system through speech. As a result, there are cases in which the speech recognition system displays an image that is very different from the image that is being displayed, or outputs a speech about a failure in speech recognition. The user is annoyed by these responses, and a feeling of displeasure of the user is increased.

On the other hand, when the user makes a speech with the intention of operating the system through speech, it is necessary for the system to execute a process corresponding to a recognition result. Further, when the speech recognition system fails in recognition, it must inform the user of the failure in the recognition.

The present invention has been made to solve the problems above. Therefore, it is an object of the present invention to reduce the feeling of displeasure of a user of a speech recognition system that continuously recognizes user's speech.

Solution to Problem

A speech recognition system in accordance with the present invention is a speech recognition system that continuously recognizes speech uttered by at least one user, and controls a device to be controlled on a basis of a recognition result, the speech recognition system including: a speech-operation-intention determinator to determine whether or not the user has an intention of operating the device to be controlled through the recognized speech; and a control mode alterer to control the device to be controlled to continuously respond, and changing, when the speech-operation-intention determinator determines that the user has no intention of operating the device to be controlled, a control mode of the device to be controlled to cause the device to operate in such a manner that the user is less aware of or pays less attention to the control mode of the device to be controlled than a case in which the speech-operation-intention determinator determines that the user has the intention of operating the device to be controlled.

Advantageous Effects of Invention

According to the present invention, when it is determined that the at least one user has no intention of operating the device to be controlled through speech, the control mode of the device to be controlled is changed in such a manner that the at least one user is less aware of or pays less attention to the control mode of a device to be controlled than the case in which it is determined that the at least one user has the intention of operating the device. Thus, according to the present invention, the feeling of displeasure of the at least one user can be reduced.

BRIEF DESCRIPTION OF DRAWINGS

FIG. 2 is a table showing an example of determination items for speech-operation-intention and their reliability;

FIGS. 3A and 3B are a table showing an example of control modes;

FIGS. 4A to 4C are a table showing another example of control modes;

FIGS. 5A and 5B are a table showing an example in which different control modes are defined in accordance with the reliability of the "speech-operation-intention";

FIGS. 6A and 6B are a table showing another example in which different control modes are defined in accordance with the reliability of the "speech-operation-intention";

DESCRIPTION OF EMBODIMENTS

Hereinafter, embodiments for carrying out the invention will now be described with reference to the accompanying drawings to explain the present invention in more detail.

Note that although the following embodiments are described using an example in which a speech recognition system in accordance with the present invention is applied to a navigation system (device to be controlled) for a mobile body such as a vehicle, the speech recognition system may foe applied to any system that has a speech operation function.

Embodiment 1

Figure 1:
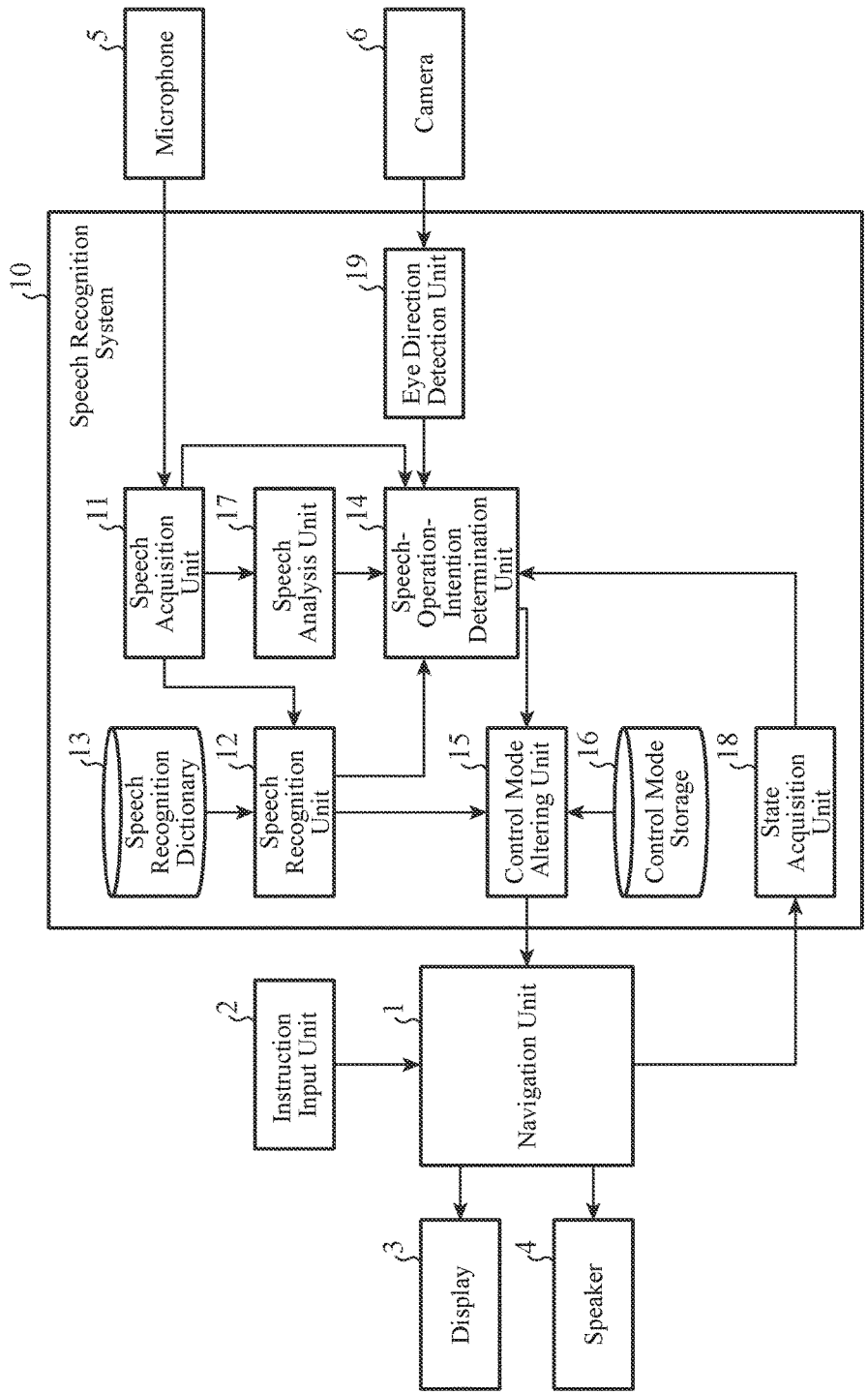
FIG. 1 is a block diagram showing an example of a navigation system to which a speech recognition system of Embodiment 1 in accordance with the present invention is applied.

FIG. 1 is a block diagram showing an example of a navigation system to which a speech recognition system 10 of an embodiment 1 in accordance with the present invention is applied. The navigation system comprises a navigation unit 1, an instruction input unit 2, a display 3, a speaker 4, a microphone 5, a camera 6, a speech acquisition unit 11, a speech recognition unit 12, a speech recognition dictionary 13, a speech-operation-intention determination unit 14, a control mode altering unit 15, a control mode storage 16, a speech analysis unit 17, a state acquisition unit 18, and an eye direction detection unit 19. Note that components of the navigation system may be dispersed to a server, mobile terminal like a smartphone, or onboard-device on a network concerned.

The speech acquisition unit 11, speech recognition unit 12, speech recognition dictionary 13, speech-operation-intention determination unit 14, control mode altering unit 15, control mode storage 16, speech analysis unit 17, state acquisition unit 18, and eye direction detection unit 19 constitute the speech recognition system 10.

The speech recognition system 10 is implemented by devices including a central processing unit (CPU), which is not shown, and the functions of the speech acquisition unit 11, speech recognition unit 12, speech recognition dictionary 13, speech-operation-intention determination unit 14, control mode altering unit 15, control mode storage 16, speech analysis unit 17, state acquisition unit 18, and eye direction detection unit 19 are carried out by causing the CPU to execute a prescribed program.

The navigation unit 1 creates drawing information to be displayed on the display 3 by using a current position information about the mobile body acquired from a Global Positioning System (GPS) receiver and information stored in a map database. The map database includes, for example, "road information" about roads (locations and the like of roads), "facility information" about facilities (types, names, locations and the like of facilities), "various pieces of character information" (place names, facilities names, intersection names, road names and the like), and "various pieces of icon information" representing facilities, road numbers and the like.

In addition, in accordance with instructions from the instruction input unit 2 or instructions from the control mode altering unit 15 which will be described later, the navigation unit 1 carries out various controls about retrieval of a traveling route, display instruction and screen transition to the display 3, speech output instruction to the speaker 4, or the like.

For example, using a facility or place set by the user through an operation on the instruction input unit 2 or speech operation on the speech recognition system 10, the information about a current position of the mobile body, and the information stored in the map database, the navigation unit 1 calculates a route from the current position to the facility or place set by the user. Then the navigation unit 1 creates a guidance map and guidance message for guiding the mobile body along the route, and instructs the display 3 and speaker 4 to output the information concerned, which is created by the navigation unit 1.

The instruction input unit 2 is a unit for receiving instructions inputted by the user manually. Examples of instruction input unit 2 include a hardware switch, touch sensor embedded in the display 3, remote control installed in the steering wheel, and recognition device for recognizing instructions by the user via a separate remote control.

The display 3 is a liquid crystal display (LCD), head-up display (HUD) or instrument panel, for example, and carries out drawing on its screen on the basis of the instructions from the navigation unit 1.

The speaker 4 outputs a speech on the basis of instructions from the navigation unit 1.

The microphone 5 acquires (collects) speech uttered by the user. As the microphone 5, it is possible to use, for example, an omnidirectional microphone, an array microphone with an array of a plurality of omnidirectional microphones, which is able to adjust the directional characteristics, or a unidirectional microphone with the directivity in one direction, which is unable to adjust the directional characteristics.

The camera 6 takes images of the user. Information about the images taken by the camera 6 is used for the eye direction detection unit 19, which will be described later, to detect an eye direction of the user.

The speech acquisition unit 11 receives a speech of the user acquired by the microphone 5, that is an input speech, and carries out analog to digital (A/D) conversion of the input speech by using, for example, the pulse code modulation (PCM). In addition, the speech acquisition unit 11 detects a speech active section corresponding to the content of the user speech from the digitized speech signal.

The speech recognition unit 12 extracts feature values of the speech data in the speech active section detected by the speech acquisition unit 11, carries out the recognition process on the basis of the feature values using the speech recognition dictionary 13, and outputs the recognition result. The recognition process can be performed using an ordinary method such as a Hidden Markov Model (HMM) method.

Incidentally, the recognition result may include a score representing a likelihood, as well as a recognition result character string.

A typical speech recognition function installed in the car navigation system or the like requires the user to clearly indicate (direct) the start of speech for the system. Thus, a button for directing a start of speech recognition (referred to as a "speech recognition start direction unit" from now on) is displayed on the touch screen or mounted on the steering wheel. After the user pushes down the speech recognition start direction unit, the speech uttered by the user is recognized. More specifically, the speech recognition start direction unit outputs a speech recognition start signal, and when the speech recognition unit receives the signal the speech recognition unit detects a speech active section corresponding to the content of the user speech from the speech data acquired after receiving the signal by the speech acquisition unit to carry out the recognition process mentioned above.

By contrast, the speech recognition unit 12 in Embodiment 1 continuously recognizes the content of the user speech even if the user does not issue the speech recognition start instruction above. More specifically, even if the speech recognition unit 12 does not receive the speech recognition start signal, it continuously extracts the feature values of the speech data from the speech active section detected by the speech acquisition unit 11, carries out the recognition process on the basis of the feature values using the speech recognition dictionary 13, and iterates the process of outputting the speech recognition results.

The speech-operation-intention determination unit 14 determines whether or not the user makes the speech with the intention of operating the device to be controlled through speech, and outputs a determination result. The following description will be made on the assumption that "the speech-operation-intention exists" if the speech-operation-intention determination unit 14 determines that the user has made the speech with the intention of effecting the speech operation, and that "the speech-operation-intention does not exist" otherwise. Determination items for making a determination as to whether or not the speech-operation-intention exists will be described later.

For recognition target words recognized by the speech recognition unit 12, the control mode storage 16 stores a control mode to be given to the navigation unit 1 as an instruction when "the speech-operation-intention exists" and a control mode to be given to the navigation unit 1 as an instruction when "the speech-operation-intention does not exist" by associating these control modes with a recognition target word.

In addition, for both cases of "the speech-operation-intention exists" and "the speech-operation-intention does not exist", the control mode storage 16 defines and stores a control mode to be given to the navigation unit 1 as an instruction when the speech recognition unit 12 fails in the speech recognition.

The term "control modes" refer to a variety of operations of a device to be controlled to which the speech recognition system 10 of the embodiment 1 is applied. For example, in the case of a navigation system, examples of control modes include a variety of operations such as screen transition, output content of a response speech and notification sound, execution of functions of the navigation system, e.g., destination settings.

Control modes for the case in which "the speech-operation-intention does not exist" are defined so as to less disturb the user than control modes for the case in which "the speech-operation-intention exists", that is, defined so as to reduce the degree to which the user is aware of or pays attention to the navigation system.

For example, in the case in which "the speech-operation-intention does not exist", the volume of a speech output is turned down, or the amount of information of speech output content or display content is reduced, than that in the case in which "the speech-operation-intention exists". Alternatively, the speech output may be stopped in the case in which "the speech-operation-intention does not exist". Thus, in the case in which "the speech-operation-intention does not exist", control modes are set in such a manner that the user is less aware of or pays less attention to the navigation system than the case in which "the speech-operation-intention exists".

Details of the control modes will be described later.

Referring to the control mode storage 16, the control mode altering unit 15 decides a control mode on the basis of the recognition result outputted by the speech recognition unit 12 and the determination result outputted by the speech-operation-intention determination unit 14, and outputs the decided control mode to the navigation unit 1.

Next, the determination items for making a determination by the speech-operation-intention determination unit 14 as to whether the speech-operation-intention exists or not, and a component for acquiring and creating the information used for the determination will be described.

(1) Determination as to whether the speech-operation-intention exists or not based on at least one of the volume, pitch, and articulation of the speech uttered by the user, the user's speech rate, and the direction of the source of the speech.

In case 1, the speech recognition system 10 comprises the speech analysis unit 17.

The speech analysis unit 17 analyzes the speech data outputted from the speech acquisition unit 11, and calculates at least one of the volume, pitch and articulation of the speech uttered by the user, the user's speech rate, and the direction of the source of the speech.

Incidentally, as for a calculation method of the volume, pitch, articulation, the user's speech rate, and the direction of the source of the speech, since a publicly known technique can be used, the description thereof will be omitted.

First, an example of using the articulation will be described.

The speech-operation-intention determination unit 14 acquires an articulation calculated by the speech analysis unit 17, and determines whether or not the articulation is equal to or greater than a predetermined threshold. If the articulation is equal to or greater than the predetermined threshold, the speech-operation-intention determination unit 14 determines that "the speech-operation-intention exists". On the other hand, if the articulation is less than the predetermined threshold, the speech-operation-intention determination unit 14 determines that "the speech-operation-intention does not exist".

Alternatively, the speech-operation-intention determination unit 14 determines whether the articulation acquired from the speech analysis unit 17 is equal to or greater than a mean value of articulations acquired previously. If the articulation is equal to or greater than the mean value, the speech-operation-intention determination unit 14 determines that "the speech-operation-intention exists". On the other hand, if the articulation is less than the mean value, the speech-operation-intention determination unit 14 determines that "the speech-operation-intention does not exist".

In the same manner as making a determination on whether the speech-operation-intention exists or not by using the articulation, the speech-operation-intention determination unit 14 determines whether a speech-operation-intention exists or not by using the volume or pitch of the speech uttered by the user.

For example, when using the volume of the speech uttered, the speech-operation-intention determination unit 14 determines that "the speech-operation-intention exists" if the volume of the speech acquired from the speech analysis unit 17 is equal to or greater than a mean value of volumes of a plurality of past speeches.

When using the pitch of the speech uttered, for example, the speech-operation-intention determination unit 14 determines that "the speech-operation-intention exists" if the pitch of the speech acquired from the speech analysis unit 17 is equal to or greater than a mean value of pitches of a plurality of past speeches.

Next, an example of using the speech rate will be described.

The speech-operation-intention determination unit 14 acquires a speech rate calculated by the speech analysis unit 17, and determines whether or not the speech rate is less than a predetermined threshold (or not greater than a mean value). If the speech rate is less than the predetermined threshold, the speech-operation-intention determination unit 14 determines that, "the speech-operation-intention exists". On the other hand, if the speech rate is equal to or greater than the predetermined threshold, the speech-operation-intention determination unit 14 determines that "the speech-operation-intention does not exist".

Alternatively, the speech-operation-intention determination unit 14 determines that "the speech-operation-intention exists" if the speech rate acquired from the speech analysis unit 17 is less than the mean value of a plurality of past, speech rates acquired or not greater than the threshold), and determines that "the speech-operation-intention does not exist" otherwise.

Incidentally, at the time of deciding on whether the speech-operation-intention exists or not by comparing the articulation or the like with the mean value in the past, it is also possible to add (or subtract) a preset value to (or from) the mean value by considering an error at the calculation of the articulation or the like by the speech analysis unit 17. The value added to (or subtracted from) the mean value is supposed to have a significant difference with the error.

Next, an example of using the direction of the source of speech will be described.

The speech-operation-intention determination unit 14 acquires a direction of the source of speech, which is calculated by the speech analysis unit 17. When a plurality of sources of speech is located in different directions, the speech-operation-intention determination unit 14 supposes that the user talks with another user, and determines that "the speech-operation-intention does not exist". In contrast, if the source of speech is one, the speech-operation-intention determination unit 14 determines that "the speech-operation-intention exists".

(2) Determination as to whether the speech-operation-intention exists or not based on a type of the recognition result.

In case (2), the speech analysis unit 17 in case (1) above is not necessary.

The speech-operation-intention determination unit 14 acquires a recognition result outputted from the speech recognition unit 12. Then, the speech-operation-intention determination unit 14 determines whether or not the recognition result is a command for operating the device to be controlled (the navigation system in the present embodiment 1) which employs the speech recognition system 10, and if the recognition result is that type of command, the speech-operation-intention determination unit 14 determines that "the speech-operation-intention exists". Otherwise, it determines that "the speech-operation-intention does not exist".

(3) Determination as to whether the speech-operation-intention exists or not based on recognition history.

In case (3), the speech analysis unit 17 in case (1) above is not necessary.

The speech-operation-intention determination unit 14 acquires a recognition result outputted from the speech recognition unit 12.

In addition, the speech-operation-intention determination unit 14 stores at least one recognition result acquired from the speech recognition unit 12 as a recognition history.

Then, the speech-operation-intention determination unit 14 determines based on the recognition history that "the speech-operation-intention exists" if a recognition score included in the recognition result is equal to or less than a predetermined threshold (that is, the recognition process by the speech recognition unit 12 is successful, but the likelihood is low), or the speech recognition unit 12 fails in the recognition process two or more times consecutively. The speech-operation-intention determination unit 14 may separately count the case where the recognition score is not greater than the predetermined threshold and the case where the recognition process is not successful, or may count the two cases without distinction.

Incidentally, the speech-operation-intention determination unit 14 may determine that "the speech-operation-intention exists" when the recognition score contained in the recognition result is not greater than the predetermined threshold two or more times consecutively and the individual character strings obtained as the recognition results are the same.

If the speech recognition unit 12 gives a low recognition score or fails in recognizing the speech uttered by the user due to a loud noise in the vehicle, since the navigation unit 1 does not perform the operation expected by the user, the user is likely to repeat the speech once again if the user has an operation intention. Accordingly, in case (3), speech-operation-intention determination unit 14 considers that the user has the operation intention through the speech when the user repeats the speech, and that the user does not have the operation intention through the speech when the user produces the speech only once. For example, when the user utters the speech "convenience" twice consecutively, and if the speech recognition unit 12 fails in the recognition process twice consecutively, the speech-operation-intention determination unit 14 determines that "the speech-operation-intention exists". Thus, if the speech recognition unit 12 succeeds in the recognition process of the third speech of the user, the recognition result of the third speech is considered to be made with "the speech-operation-intention".

Incidentally, when the user utters the speech "convenience" and its recognition score is not greater than the threshold, there is a possibility that the user changes the second speech to "convenience store" or the like. Accordingly, it does not matter whether the character strings, which are a recognition result of each speech, are same or differ from each other.

(4) Determination as to whether a speech-operation-intention exists or not on the basis of the operation state of a system which employs the speech recognition system 10.

In case (4), the speech recognition system 10 comprises the state acquisition unit 18. The speech analysis unit 17 in case (1) above is not necessary.

The state acquisition unit 18 acquires the operation state of the navigation system from the navigation unit 1.

The speech-operation-intention determination unit 14 defines in advance operation states of the navigation system on which the user is assumed to try to perform an operation or to be carrying out an operation, such as displaying a result of a prescribed operation by the user (for example, displaying a list of retrieval results about facilities), and carrying out an operation like pushing down a key by the user.

When the operation state of the navigation system acquired by the state acquisition unit 18 agrees with one of the operation states defined in advance, the speech-operation-intention determination unit 14 determines that "the speech-operation-intention exists", but when the operation state of the navigation system does not agree with any one of the operation states defined in advance, the speech-operation-intention determination unit 14 determines that "the speech-operation-intention does not exist".

For example, during display of the list of retrieval results about facilities. It is likely that the user performs an operation with the intention of operating the navigation system, such as selecting one of the facilities from the list. Thus, when the operation state of the navigation system is the state of displaying the list, the speech-operation-intention determination unit 14 determines that "the speech-operation-intention exists".

Alternatively, the speech-operation-intention determination unit 14 may assign "the speech-operation-intention exists" or "the speech-operation-intention does not exist" to each operation state of the navigation system in advance.

For example, when selecting an item from a list of retrieval results about facilities, the user is apt to perform a speech operation. On the other hand, when moving down a hierarchical menu by pushing down a button for setting a facility retrieval condition or the like, the user is apt to perform a manual operation via the instruction input unit 2. Thus, when the operation state of the navigation system is the state of displaying a list, the operation state is defined as "the speech-operation-intention exists", and when the operation state is the state of displaying a hierarchical menu, the operation state is defined as "the speech-operation-intention does not exist". The speech-operation-intention determination unit 14 searches for the definition that agrees with the operation state of the navigation system acquired by the state acquisition unit 18, and determines that "the speech-operation-intention exists" or "the speech-operation-intention does not exist" in accordance with the definition.

In addition, while the user is carrying out a manual operation, for example, it is unlikely that the user switches the manual operation to a speech operation. Accordingly, when the operation state of the navigation system is the manual operation, the operation state may be defined as "the speech-operation-intention does not exist". More specifically, when the state acquisition unit 18 acquires the operation state of the user on the instruction input unit 2 via the navigation unit 1, and when the speech-operation-intention determination unit 14 determines that the user is carrying out a manual operation on the list during display or the like on the basis of the operation state, the speech-operation-intention determination unit 14 determines that "the speech-operation-intention does not exist" in accordance with the definition defined for the manual operation.

(5) Determination as to whether the speech-operation-intention exists or not on the basis of the eye direction during speech or before speech.

In case (5), the speech recognition system 10 comprises an eye direction detection unit 19. The speech analysis unit 17 in case (1) above and the state acquisition unit 18 in case (4) above are not necessary.

The eye direction detection unit 19 detects the eye direction of the user by analyzing the image information acquired by the camera 6. The speech-operation-intention determination unit 14 determines whether or not the user watches, for example, a component of the navigation system, such as the display 3 or at an image like an agent displayed on the display 3 on the basis of the eye direction information detected by the eye direction detection unit 19.

Incidentally, as for an eye direction detection method and a method for determining whether the user watches a specific object or not on the basis of the eye direction information, since a publicly known technique can be used, descriptions of these methods will be omitted.

In addition, the speech-operation-intention determination unit 14 requests the speech acquisition unit 11 to provide the speech data of a speech active section. Then, when the speech-operation-intention determination unit 14 can acquire the speech data from the speech acquisition unit 11 (that is, when the user makes speech), and determines that the user watches the display 3 or the like, the speech-operation-intention determination unit 14 determines that "the speech-operation-intention exists". On the other hand, the speech-operation-intention determination unit 14 determines that the user does not watch the display 3 or the like, it determines that "the speech-operation-intention does not exist".

Here, when the speech-operation-intention determination unit 14 can acquire the speech data from the speech acquisition unit 11, and determines that the user watched the display 3 or the like at least, a prescribed time before (for example, 0.5 second before the speech), the speech-operation-intention determination unit 14 may determine that "the speech-operation-intention exists". Alternatively, the speech-operation-intention determination unit 14 may determine that "the speech-operation-intention exists" when the user makes speech while watching the display 3 or the like.

The speech-operation-intention determination unit 14 may determine whether or not the speech-operation-intention exists using at least one of the foregoing methods (1)-(5); the speech analysis unit 17, state acquisition unit 18 and eye direction detection unit 19 are not an essential component.

Incidentally, when the speech-operation-intention determination unit 14 determines that "the speech-operation-intention exists", it may be configured to output not only a determination result, but also a reliability of the determination result (referred to as "reliability" in the following description).

The "reliability" is information indicating the possibility that, the user actually makes speech to the system with the intention of the speech operation. That is, comparing the case in which the speech-operation-intention determination unit 14 determines that "the speech-operation-intention exists" using a determination item with lower "reliability" being defined with the case in which the speech-operation-intention determination unit 14 determines that "the speech-operation-intention exists" using a determination item with higher "reliability" being defined, the speech-operation-intention determination unit 14 determines that the latter case gives higher possibility that the user actually makes the speech with the intention of instructing the speech operation to the system.

FIG. 2 shows an example of determination items of the speech-operation-intention and their reliability. In the example the reliability is expressed in two values of "high" and "low", in which "high" indicates the high reliability and "low" indicates the low reliability. The reliability may take, for example, multilevel values such as "high", "middle", "low", or consecutive values such as "1-100".

FIGS. 3-6 show examples of control modes stored in the control mode storage 16.

FIG. 3A shows an example of control modes relating to "the speech-operation-intention exists" and "the speech-operation-intention does not exist" for recognition target words.

With respect to a recognition target word "convenience store", the control mode for the case in which "the speech-operation-intention exists" is defined as "retrieve convenience stores around the self vehicle and display a list of retrieval results". On the other hand, the control mode for the case in which "the speech-operation-intention does not exist" is defined as "do nothing".

With respect to a recognition target word "Mr. Child", the control mode for the case in which "the speech-operation-intention exists" is defined as "display the list of albums of Mr. Child". On the other hand, the control mode for the case in which "the speech-operation-intention does not exist" is defined as "do nothing". Here, the target word "Mr. Child" is used as an artist name.

Incidentally, although examples of executing functions and screen display are shown here, a speech output may be made. For example, a speech may be output to inform that retrieval is to be executed, and that the list of retrieval results is to be displayed.

In addition, FIG. 3B shows control modes when the speech recognition is unsuccessful. The control mode for the case in which "the speech-operation-intention exists" is defined as an operation for informing that the recognition is unsuccessful, such as "output speech, 'Unable to recognize. Speak once more, please'". On the other hand, the control mode for the case in which "the speech-operation-intention does not exist" is defined as "do nothing".

Incidentally, although only the example of speech output is shown here, a screen display may be made. For example, when "the speech-operation-intention exists" a subtitle for informing that the recognition is unsuccessful may be displayed on the screen.

FIG. 4A is a table showing another example of the control modes with respect to the recognition target words when "the speech-operation-intention exists" and "the speech-operation-intention does not exist". In the example of FIG. 3, the control mode for the case in which "the speech-operation-intention does not exist" is "do nothing" so as to make the user less aware of or pay less attention to the navigation system than the control mode for the case in which "the speech-operation-intention exists". In contrast with this, in the example of FIG. 4, even when "the speech-operation-intention does not exist" the speech recognition system performs an operation. However, the degree to which the user is aware of or pays attention to the navigation system owing to the operation is made less than the case where "the speech-operation-intention exists".

For example, in FIG. 4A, with respect to the recognition target word "convenience store", the control mode for the case in which "the speech-operation-intention does not exist" is defined as, not "do nothing", but "create and display a button for retrieving convenience stores around the self vehicle".

Figure 7:
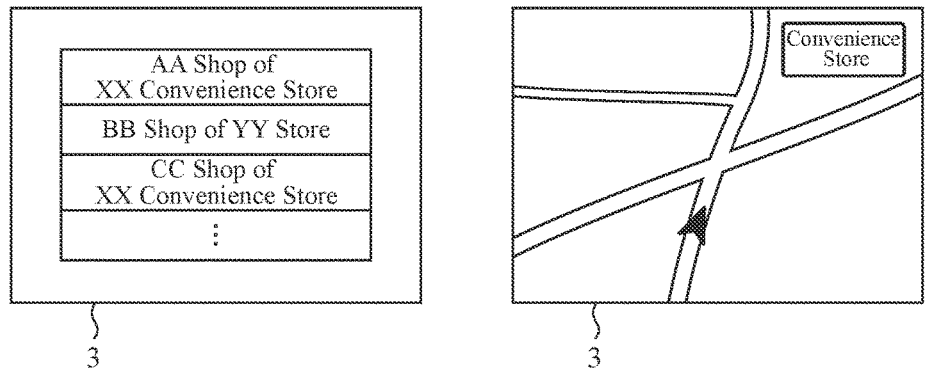
FIG. 7 illustrates an example in which a navigation unit executes a process on the basis of a control mode.

Here, FIG. 7 shows an example of executing a process on the basis of the control mode. FIG. 7A shows a screen display on the display 3 in the case of "retrieve convenience stores around the self vehicle and display a list of retrieval results" of FIG. 4A. The list of retrieval results is largely displayed on the display screen so as to make the user easily aware of the navigation system. On the other hand, FIG. 7B shows an example of the screen display on the display 3 in the case of "create and display a button for retrieving convenience stores around the self vehicle" of FIG. 4B. Only the button "convenience store" is displayed on a map screen so as make the user less aware of or pay less attention to the navigation system than the case of FIG. 7A.

Incidentally, when outputting the speech informing that the retrieval is executed, the control mode may be defined in a manner so as to turn down the volume in the case where "the speech-operation-intention does not exist" than the case where "the speech-operation-intention exists".

In addition, in FIG. 4B, control modes at a failure of the speech recognition are defined as "output speech: 'Unable to recognize. Speak once more, please'" for the case in which "the speech-operation-intention exists", and as "output notification sound" is defined for the case in which "the speech-operation-intention does not exist".

Thus, outputting only the notification sound such as "pong" when "the speech-operation-intention does not exist" can make the user less aware of or pay less attention to the navigation system than the case where "the speech-operation-intention exists".

In addition, as shown in FIG. 4C, the control modes at a failure of the speech recognition are defined as "output speech at volume 8: 'Unable to recognize. Speak once more, please'" for the case in which "the speech-operation-intention exists", and as "output speech at volume 3: 'unable to recognize. Speak once more, please'" for the case in which "the speech-operation-intention does not exist".

In this way, turning down the volume of the speech for informing the user of "the speech-operation-intention does not exist" can make the user less aware of or pay less attention to the navigation system than the case where "the speech-operation-intention exists".

Next, referring to FIG. 5, examples will be described which defines different, control modes in accordance with the reliability of "the speech-operation-intention exists".

FIG. 5A is a table showing an example of control modes with respect to recognition target words, for the case in which the reliability of "the speech-operation-intention exists" is "high", for the case in which the reliability of "the speech-operation-intention exists" is "low", and for the case in which "the speech-operation-intention does not exist".

For example, with respect to the recognition target word "convenience store", the control mode for the case in which "the speech-operation-intention exists" and the reliability is "high" is defined as "retrieve convenience stores around the self vehicle, and display information about the convenience store nearest to the position of the self vehicle". On the other hand, the control mode for the case in which "the speech-operation-intention exists" and the reliability is "low" is defined as "retrieve convenience stores around the self vehicle and display a list of retrieval results". Then, the control mode for the case in which "the speech-operation-intention does not exist" is defined as "create a button for retrieving convenience stores around the self vehicle".

In addition, in FIG. 5B, control modes at a failure of the speech recognition are defined as "output speech, 'unable to recognize. Speak once more, please'" for the case in which "the speech-operation-intention exists" and the reliability is "high", as "output notification sound only" for the case in which "the speech-operation-intention exists" and the reliability is "low", and as "do nothing" for the case in which "the speech-operation-intention does not exist".

Incidentally, it is also possible to turn up the volume when the reliability is high, and to turn down the volume when the reliability is low.

Incidentally, the control mode may be defined depending on whether the reliability of "the speech-operation-intention exists" is not greater than a predetermined reference value (or less than the reference value), or greater than the reference value for not less than the reference value). That is, even when "the speech-operation-intention exists", if the reliability is not greater than the predetermined reference value, a determination may be made that "the speech-operation-intention does not exist".

FIGS. 6A and 6B show an example. In the example of FIG. 6A, for the case in which the reliability of "the speech-operation-intention exists" with respect to the recognition target word is "low", the same control mode is defined as for the case in which "the speech-operation-intention does not exist". In the example of FIG. 6B, for the case in which the speech recognition is unsuccessful and the reliability of "the speech-operation-intention exists" is "low", the same control mode as for the case in which "the speech-operation-intention does not exist" is defined.

Next, the operation of the speech recognition system 10 of the embodiment 1 will be described with reference to the flowchart of FIG. 8.

First, the speech acquisition unit 11 receives the user speech acquired through the microphone 5, that is, the input speech, carries out the A/D conversion of the user speech by using PCM, for example, and detects a speech active section (step ST01).

Next, the speech recognition unit 12 recognizes the speech data in the speech active section detected by the speech acquisition unit 11, and outputs a recognition result, (step ST02).

After that, the speech-operation-intention determination unit 14 acquires information for determining whether or not the speech-operation-intention exists (step ST03), determines whether or not the speech-operation-intention exists, and outputs the determination result (step ST04).

Then, referring to the control mode storage 16, the control mode altering unit 15 determines a control mode on the basis of the recognition result outputted by the speech recognition unit 12 and the determination result outputted by the speech-operation-intention determination unit 14, and outputs the determined control mode to the navigation unit 1 (step ST05).

Finally, the navigation unit 1 executes the process on the basis of the control mode instructed by the control mode altering unit 15 (step ST06).

Next, the operation will be described using a concrete example.

First, an example in which the speech recognition of the user speech is successful will be described.

It is assumed here that users A and B are in the same vehicle. In addition, it is assumed that the speech analysis unit 17 calculates only articulation of the user speech, and the control mode storage 16 stores the contents shown in FIGS. 4A and 4B. Furthermore, it is assumed that the range of articulation is "0-100", and the predetermined threshold is "50".

Suppose that the user A talks to the user B: "Which convenience store's rice balls do you like best?" The speech is collected through the microphone 5, and the speech acquisition unit 11 receives the speech acquired through the microphone 5, and carries out A/D conversion of the speech (step ST01). As described before, since the speech recognition unit 12 continuously carries out the recognition process of the speech data acquired by the speech acquisition unit 11, the speech recognition unit 12 recognizes the speech of the user A digitized by the speech acquisition unit 11, and outputs "convenience store" as a recognition result (step ST02).

Next, the speech analysis unit 17 analyzes the speech data acquired by the speech acquisition unit 11, and calculates the articulation of the speech of the user A, and the speech-operation-intention determination unit 14 acquires the articulation (step ST03).

Here, suppose that the calculated articulation is "40".

Since the articulation calculated by the speech analysis unit 17 is less than the predetermined threshold "50", the speech-operation-intention determination unit 14 considers that the user does not talk with the intention of effecting the speech operation on the system, and determines that "the speech-operation-intention does not exist" (step ST04).

After that, referring to the contents of FIG. 4A in the control mode storage 16, the control mode altering unit 15 decides a control mode when the recognition target word is "convenience store" and when "the speech-operation-intention does not exist". In this example, the control mode altering unit 15 decides the control mode "create and display a button for retrieving convenience stores around the self vehicle" (step ST05).

Finally, the navigation unit 1 executes the process on the basis of the control mode decided by the control mode altering unit 15. As a result, as shown in FIG. 7B, the button for retrieving convenience stores around the self vehicle is displayed on the display 3 (step ST06).

On the other hand, suppose that the recognition score contained in the recognition result outputted from the speech recognition unit 12 at step ST02 is not greater than the prescribed threshold, or the speech recognition process ends in failure because of a large in-vehicle noise or the like.

In this case, referring to the contents of FIG. 4B in the control mode storage 16, the control mode altering unit 15 decides at step ST05 a control mode when "the recognition result ends in failure" and "the speech-operation-intention does not exist". In the example, the control mode altering unit 15 decides "output notification sound" as the control mode.

As a result, a notification sound like "pong" is outputted from the speaker 4 (step ST06).

Next, the operation will be described when the user A talks to the navigation system: "I want to go to a convenience store".

Figure 8:
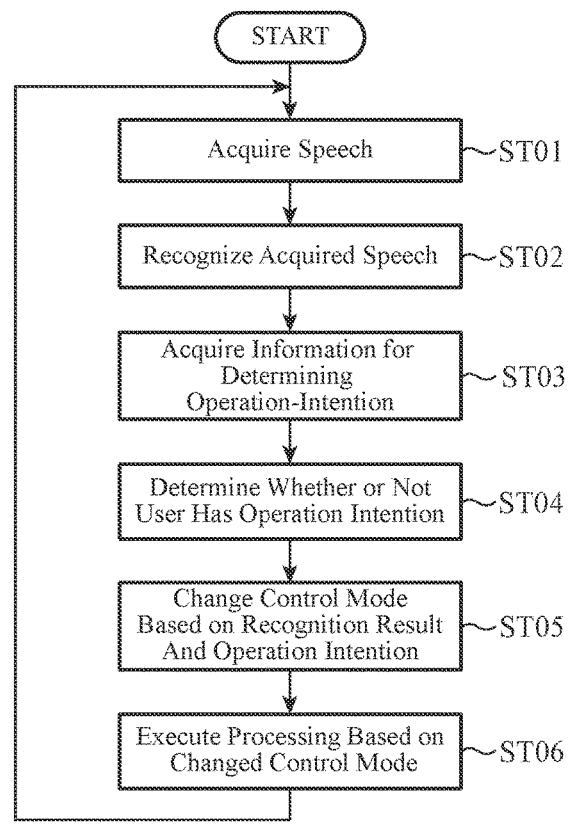
FIG. 8 is a flowchart showing the operation of the speech recognition system, according to Embodiment 1.

Since the process at step ST01 and step ST02 of FIG. 8 is the same as that described above, the description thereof will be omitted here. Assume that the speech analysis unit 17 calculates that the articulation is "70", and the speech-operation-intention determination unit 14 acquires the articulation (step ST03).

Since the articulation "70" calculated by the speech analysis unit 17 is not less than the predetermined threshold "50", the speech-operation-intention determination unit 14 considers that the user makes the speech with the intention of operating the system, through speech, and determines that "the speech-operation-intention exists" (step ST04).

After that, referring to the contents of FIG. 4A of the control mode storage 16, the control mode altering unit 15 decides a control mode when the recognition target word is "convenience store" and "the speech-operation-intention exists". In the example, the control mode altering unit 15 decides as the control mode "retrieve convenience stores around the self vehicle and display a list of retrieval results" (step ST05).

Finally, the navigation unit 1 executes the process on the basis of the control mode determined by the control mode altering unit 15. As a result, as shown in FIG. 7A, the list as a result of retrieving convenience stores around the self vehicle is displayed on the display 3 (step ST06).

On the other hand, suppose that the recognition score contained in the recognition result outputted from the speech recognition unit 12 at step ST02 is not greater than the prescribed threshold, or the speech recognition process ends in failure because of a large in-vehicle noise.

In this case, referring to the contents of FIG. 4B in the control mode storage 16, the control mode altering unit 15 decides at step ST05 a control mode when "the recognition result ends in failure" and "the speech-operation-intention exists". In the example, the control mode altering unit 15 decides as the control mode "output speech: 'Unable to recognize. Speak once more, please'".

As a result, the speech "unable to recognize. Speak once more, please" is outputted from the speaker 4 (step ST06).

As described above, according to Embodiment 1, the speech recognition system 10, which continuously recognizes the speech uttered by a user and controls the navigation system on the basis of the recognition result, is configured to comprise: the speech-operation-intention determination unit 14 for determining whether or not the user has an intention of operating the navigation system through the recognized speech; and the control mode altering unit 15 for changing, when the speech-operation-intention determination unit 14 determines that the user has no intention of operating the navigation system, the control mode of the navigation system in such a manner that the user is less aware of or pays less attention to the navigation system than the case in which the speech-operation-intention determination unit determines that the user has the intention of operating the navigation system. Thus, the control mode corresponding to the recognition result for the case where it is determined that the user has no intention of operating the navigation system through speech is changed into a control mode which the user is less aware of or pays less attention to than the case where it is determined that the user has the intention of operating the navigation system through speech. Therefore, according to Embodiment 1, the feeling of displeasure and annoyance of the user can be reduced.

Further, according to Embodiment 1, the speech-operation-intention determination unit 14 determines a reliability that indicates the degree of the operation intention when the unit 14 determines that the user has the operation intention, and the control mode altering unit 15 changes, when the reliability determined by the speech-operation-intention determination unit 14 is low, the control mode in such a manner that the user is less aware of or pays less attention to the control mode of the navigation system than the case where the reliability is high. Thus, according to Embodiment 1, the control mode can be changed in accordance with the level of probability to which the user has actually uttered the speech with the intention of operation. Therefore, according to Embodiment 1, the feeling of displeasure and annoyance of the user can be reduced further. In addition, according to Embodiment 1, it is possible to recognize a natural conversation between the users, and provide an operation that the user(s) would probably desire without disturbing the conversation between the users.

Further, according to Embodiment 1, when it is failed to recognize the speech uttered by the user, the control mode altering unit 15 controls the navigation system to Inform the user of the recognition failure, and to change, when the reliability of the operation intention through speech is low, the notification mode in such a manner that the user is less aware of or pays less attention to the navigation system than a case where the reliability is high.

Further, when notifying the user of the recognition failure by speech and if the reliability of the operation intention through speech is low, the control mode altering unit 15 turns down the volume of the speech of recognition failure than the case where the reliability is high.

Therefore, according to Embodiment 1, the feeling of displeasure and annoyance of the user can be reduced.

Further, according to Embodiment 1, when speeches arrive from a plurality of directions, the speech-operation-intention determination unit 14 determines that the user has no operation intention through speech. Accordingly, according to embodiment 1, the feeling of displeasure and annoyance of the users can be reduced without disturbing the conversation between the users.

Further, according to Embodiment 1, when it is failed to recognize the speech uttered by the user, the control mode altering unit 15 controls the device to be controlled to notify the user of the recognition failure, and to change, when the speech-operation-intention determination unit 14 determines that the user has no operation intention through speech, the notification mode in such a manner that the user is less aware of or pays less attention to the notification mode than the case where the speech-operation-intention determination unit determines that the user has the operation intention through speech. Accordingly, according to Embodiment 1, the feeling of displeasure and annoyance of the user can be reduced when notifying the user of the recognition failure.

It should be noted that combination, modification or omission of parts of embodiments described above may he made within the scope of the invention.

INDUSTRIAL APPLICABILITY

A speech recognition system in accordance with the present invention is configured so as to switch the control mode corresponding to the recognition result depending on whether or not a user produces speech with an operation intention by speech. Accordingly, it is suitable for an application to a speech recognition system or the like that continuously recognizes the speech of a user.

REFERENCE SIGNS LIST 1 navigation unit; 2 instruction input unit; 3 display; 4 speaker; 5 microphone; 6 camera; 10 speech recognition system; 11 speech acquisition unit; 12 speech recognition unit; 13 speech recognition dictionary; 14 speech-operation-intention determination unit; 15 control mode altering unit; 16 control mode storage; 17 speech analysis unit; 18 state acquisition unit 19 eye direction detection unit.

The invention claimed is:
1. A speech recognition system that controls a device on a basis of a recognition result from a user's uttered speech, the speech recognition system comprising:
   a speech recognizer that continuously recognizes speech uttered by at least one user;
   a speech-operation-intention determinator that makes a determination on whether or not the user has an intention of operating the device by uttering the speech based on at least one of: (1) a volume, pitch, and articulation of the speech uttered by the user, (2) a rate of the user's speech, and (3) a direction of a source of the user's speech; and
   a control mode alterer that controls the device by sending instructions to the device based on the recognized speech and the determination of the speech-operation-intention determinator, wherein
   the speech-operation-intention determinator determines a reliability indicating a degree of the intention of operating the device when the speech-operation-intention determinator determines that the user has the intention of operating the device,
   when the speech uttered by the user is failed to be recognized, the instructions sent to the device cause the device to notify the user of the failure in recognizing the speech,
   the notification is altered based on the determination of the speech-operation-intention determinator such that when the reliability of the intention of operating the device is low, a mode of notification is different than the mode of notification in a case in which the reliability is high,
   when the speech uttered by the user is successfully recognized and it is determined that the user has no intention of operating the device with the uttered speech, the instructions sent to the device cause the device to operate in such a manner that the user is less aware of or pays less attention to the operation of the device than in a case in which it is determined that the user has the intention of operating the device, the control mode alterer obtains a determination result that indicates whether or not recognition of the speech by the user is unsuccessful, the control mode alterer controls the device, when the speech uttered by the user is failed to be recognized to inform the user of a failure in recognizing the speech;

the control mode alterer changes the instructions sent to the device, when the speech-operation-intention determinator determines that the user has no intention of operating the device such that a mode of notification of the failed speech recognition is provided in such a manner that the user is less aware of or pays less attention to the mode of notification than in the case in which the speech-operation-intention determinator determines that the user has the intention of operating the device to be controlled, when the speech uttered by the user is failed to be recognized, the instructions sent to the device cause the device to notify the user of the failure in recognizing the speech by sound such that when the reliability of the intention of operating the device is low, the volume of the sound is lower than the volume of the sound notification when the reliability is high.

2. The speech recognition system according to claim 1, wherein the control mode alterer changes the instructions sent to the device such that, when the reliability determined by the speech-operation-intention determinator is low, the device operates in such a manner that the user is less aware of or pays less attention to the device to be controlled than in a case in which the reliability is high.

3. The speech recognition system according to claim 1, wherein the speech-operation-intention determinator determines that the user has no intention of operating the device to be controlled when speeches arrive from a plurality of directions.

4. The speech recognition system according to claim 1, wherein the instructions sent to the device cause the device to operate in such a manner that the user is less aware of or pays less attention to the operation of the device by causing the device to turn down the volume of speech output of the device, or reduce an amount of information of speech output content or display content of the device, or a process volume to be processed by the device.

* * * * *